United States Patent [19]

Slicker

[11] Patent Number: 5,293,316
[45] Date of Patent: Mar. 8, 1994

[54] CLOSED LOOP LAUNCH AND CREEP CONTROL FOR AUTOMATIC CLUTCH

[75] Inventor: James M. Slicker, Union Lake, Mich.

[73] Assignee: Eaton Corporation, Cleveland, Ohio

[21] Appl. No.: 772,204

[22] Filed: Oct. 7, 1991

[51] Int. Cl.⁵ .................... G06F 15/50; F16D 43/22
[52] U.S. Cl. ................... 364/424.1; 74/866; 192/0.076; 192/0.035
[58] Field of Search ........... 364/424.1, 426.03, 426.04, 364/426.02; 74/866, 862, 867, 868; 192/0.032, 0.033, 0.034, 3.29, 3.3, 3.31; 180/197, 248

[56] References Cited

U.S. PATENT DOCUMENTS

| | | | |
|---|---|---|---|
| 3,297,926 | 1/1967 | Campbell et al. | 318/138 |
| 4,081,065 | 3/1978 | Smyth et al. | 192/0.076 |
| 4,082,011 | 4/1978 | McQuinn et al. | 74/862 |
| 4,457,411 | 7/1984 | Hiramatsu | 192/0.076 |
| 4,674,609 | 6/1987 | Sturges et al. | 192/0.033 |
| 4,724,939 | 2/1988 | Lockhart et al. | 192/3.3 |
| 4,766,544 | 8/1988 | Kurihara et al. | 364/424.1 |
| 4,766,967 | 8/1988 | Slicker et al. | 180/54.1 |
| 4,768,635 | 9/1988 | Sakurai et al. | 192/0.076 |
| 4,792,902 | 12/1988 | Hrovat et al. | 364/424.1 |
| 4,823,925 | 4/1989 | Ohkumo et al. | 192/0.076 |
| 4,975,845 | 12/1990 | Mehta | 364/424.1 |
| 4,989,686 | 2/1991 | Miller et al. | 180/197 |
| 5,016,175 | 5/1991 | Baltusis et al. | 364/424.1 |
| 5,123,302 | 6/1992 | Brown et al. | 74/866 |
| 5,126,942 | 6/1992 | Matsuda | 364/426.02 |
| 5,157,608 | 10/1992 | Sankpal et al. | 364/424.1 |
| 5,174,334 | 12/1992 | Nogle | 137/596.17 |

FOREIGN PATENT DOCUMENTS

| | | |
|---|---|---|
| 2153954 | 8/1985 | United Kingdom . |
| 2231116 | 7/1990 | United Kingdom . |

*Primary Examiner*—Thomas G. Black
*Assistant Examiner*—Jacques H. Louis-Jacques
*Attorney, Agent, or Firm*—Krass & Young

[57] ABSTRACT

An automatic clutch controller for a vehicle that reduces the oscillatory response to clutch engagement. The automatic clutch controller receives inputs from an engine speed sensor and a transmission input speed sensor and develops a clutch engagement signal controlling a clutch actuator between from disengaged to fully engaged. The clutch engagement signal at least partially engages the friction clutch in a manner to cause the measured transmission input speed to asymptotically approach a reference speed employing an approximate inverse model of this oscillatory response. In a launch mode, corresponding to normal start of the vehicle, the reference speed is the measured engine speed. In a creep mode, corresponding to slow speed creeping of the vehicle, the reference speed is a creep speed reference based on the throttle setting and the engine speed. The two modes are selected based upon the throttle setting. The automatic clutch controller preferably includes an integral error function and a differential engine speed function, which together adaptively adjust clutch engagement corresponding to vehicle loading.

28 Claims, 3 Drawing Sheets

CLOSED LOOP LAUNCH AND CREEP CONTROL FOR AUTOMATIC CLUTCH

TECHNICAL FIELD OF THE INVENTION

The technical field of this invention is that of automatic clutch controls, and more particularly closed loop automatic clutch controls for reducing oscillatory response to launch and creep of a motor vehicle.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not exhibited in the use of the hydraulic torque converters. The mechanical drive train of a motor vehicle typically exhibits considerable torsional compliance in the driveline between the transmission and the traction wheels of the vehicle. This torsional compliance may be found in the drive shaft between the transmission and the differential or the axle shaft between the differential and the driven wheels. It is often the case that independent design criteria encourages or requires this driveline to exhibit considerable torsional compliance. The existence of substantial torsional compliance in the driveline of the motor vehicle causes oscillatory response to clutch engagement. These oscillatory responses can cause considerable additional wear to the drive train components and other parts of the vehicle. In addition, these oscillatory responses can cause objectionable passenger compartment vibrations.

The oscillatory response of the driveline to clutch engagement is dependent in large degree to the manner in which the input speed of the transmission, i.e. the speed of the clutch, approaches the engine speed. A smooth approach of these speeds, such as via a decaying exponential function, imparts no torque transients on clutch lockup. If these speeds approach abruptly, then a torque transient is transmitted to the driveline resulting in an oscillatory response in the vehicle driveline.

Thus it would be an advantage to provide automatic clutch actuation of a friction clutch that reduces the oscillatory response to clutch engagement. The problem of providing such automatic clutch actuation is considerably increased in large trucks. In particular, large trucks exhibit a wide range of variability in response between trucks and within the same truck. The total weight of a particular large truck may vary over an 8 to 1 range from unloaded to fully loaded. The driveline compliance may vary over a range of about 2 to 1 among different trucks. Further, the clutch friction characteristic may vary within a single clutch as a function of degree of clutch engagement and between clutches. It would be particularly advantageous to provide such an automatic clutch actuation system that does not require extensive adjustment to a particular motor vehicle or the operating condition of the motor vehicle.

SUMMARY OF THE INVENTION

This invention is an automatic clutch controller used in a combination including a source of motive power, a friction clutch, and at least one inertially-loaded traction wheel connected to the friction clutch that has a torsional compliance exhibiting an oscillatory response to torque inputs. The automatic clutch controller is preferably used with a transmission shift controller. This automatic clutch controller provides smooth clutch engagement during vehicle launch, following transmission shifts and during creep to minimize the oscillatory response to clutch engagement. This automatic clutch controller is useful in large trucks.

The automatic clutch controller receives inputs from an engine speed sensor and a transmission input speed sensor. The transmission input speed sensor senses the rotational speed at the input to the transmission, which is the output of the friction clutch. The automatic clutch controller develops a clutch engagement signal controlling a clutch actuator between fully disengaged and fully engaged. The clutch engagement signal engages the friction clutch in a manner causing asymptotic approach of the transmission input speed to a reference speed. This minimizes the oscillatory response to torque inputs of the inertially-loaded traction wheel.

In the preferred embodiment the automatic clutch controller operates in two modes. In a launch mode, corresponding to normal start of the vehicle, the clutch engagement signal causes the transmission input speed to asymptotically approach the engine speed. This same mode may optionally also be used for clutch re-engagement upon transmission gear shifts. In a creep mode, corresponding to slow speed creeping of the vehicle, the clutch engagement signal causes the transmission input speed to asymptotically approach a creep reference signal. This creep reference signal is generated based on the amount of throttle and the engine speed. The two modes are selected based upon the throttle setting. The launch mode is selected for a throttle of more than 25% full throttle, otherwise the creep mode is selected.

The automatic clutch controller is preferably implemented in discrete difference equations executed by a digital microcontroller. The microcontroller implements a compensator having a transfer function approximately the inverse of the transfer function of the inertially-loaded traction wheel. This compensator transfer function includes a notch filter covering the region of expected oscillatory response of the driveline. The frequency band of this notch filter must be sufficiently broad to cover a range of frequencies because the oscillatory response frequency may change with changes in vehicle loading and driveline characteristics.

The clutch actuation controller preferably stores sets of coefficients for the discrete difference equations corresponding to each gear ratio of the transmission. The clutch actuation controller recalls the set of coefficients corresponding to the selected gear ratio. These recalled set of coefficients are employed in otherwise identical discrete difference equations for clutch control.

The automatic clutch controller preferably includes an integral function within the compensator for insuring full clutch engagement within a predetermined interval of time after initial partial engagement when in the launch mode. Any long term difference between the transmission input speed reference signal and the transmission input speed generates an increasing signal that eventually drives the clutch to full engagement.

The automatic clutch controller may further include a differentiator connected to the engine speed sensor. The engine speed differential signal corresponding to the rate of change of the engine speed signal is added to the signal supplied to the compensator. This differential signal causes rapid advance of clutch actuation when the engine speed is accelerating. Rapid advance of the clutch under these conditions prevents the engine speed from running away. An integrator connected to the differentiator saves the clutch actuation level needed to restrain the engine speed once the engine speed is no longer accelerating.

BRIEF DESCRIPTION OF THE DRAWINGS

These and other objects and aspects of the present invention will be described below in conjunction with the drawings in which.

DETAILED DESCRIPTION OF THE PREFERRED EMBODIMENTS

Figure 1:
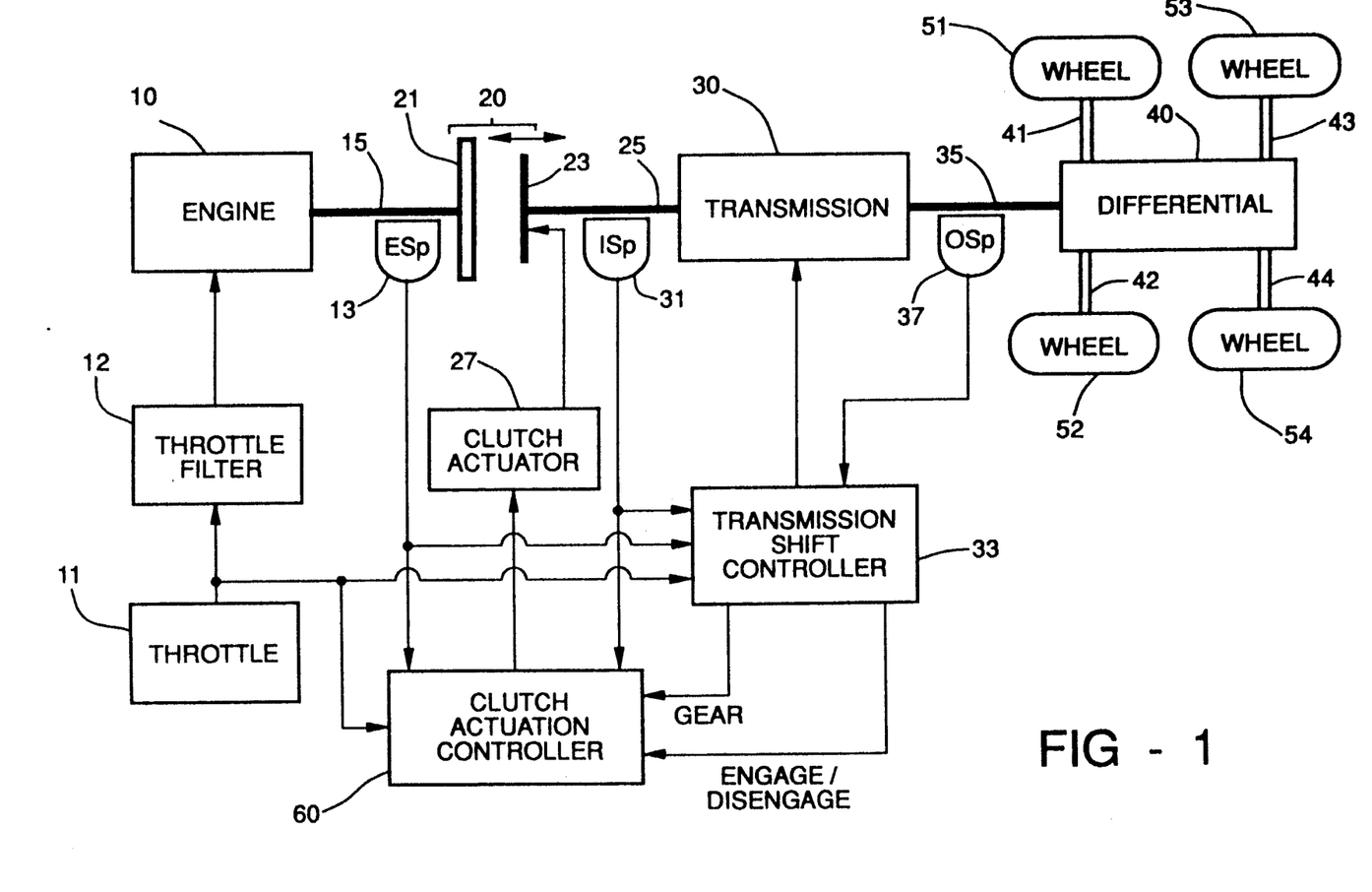
FIG. 1 illustrates a schematic view of the vehicle drive train including the clutch actuation controller of the present invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. Throttle 11, which is usually a foot operated pedal, controls operation of engine 10 via throttle filter 12. Throttle filter 12 filters the throttle signal supplied to engine 10 by supplying a ramped throttle signal upon receipt of a step throttle increase via throttle 11. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
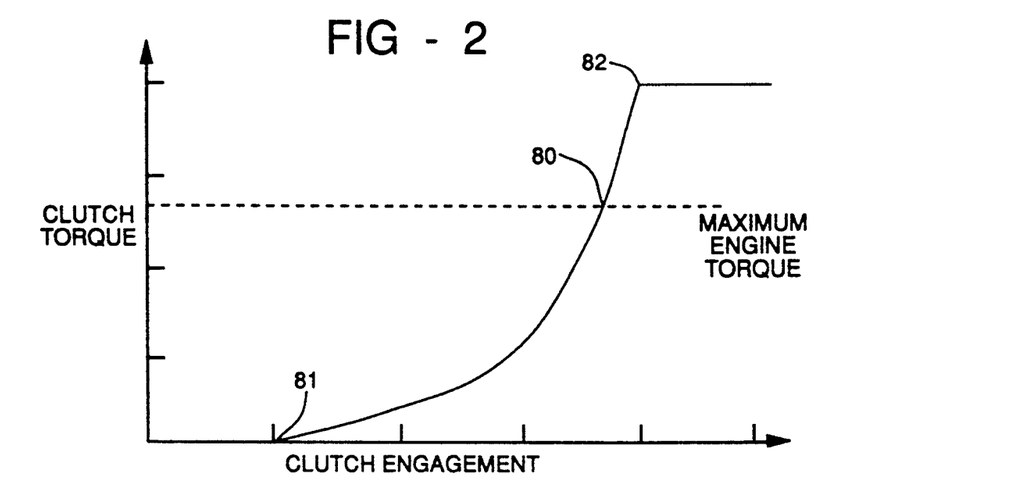
FIG. 2 illustrates the typical relationship between clutch engagement and clutch torque.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60.

Transmission input speed sensor 31 senses the rotational velocity of input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. In the preferred embodiment of the present invention, in which the motor vehicle is a large truck, differential 40 drives four axle shafts 41 to 44 that are in turn coupled to respective wheels 51 to 54.

Transmission shift controller 33 receives input signals from throttle 11, engine speed sensor 13, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear.

Note transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system controlling movable plate 23 to this desired position. It is also feasible for the clutch engagement signal to represent a desired clutch pressure with clutch actuator 27 providing closed loop control to this desired pressure. Depending on the particular vehicle, it may be feasible for clutch actuator 27 to operate in an open loop fashion. The exact details of clutch actuator 27 are not crucial to this invention and will not be further discussed.

Clutch actuation controller 60 preferably generates a predetermined open loop clutch disengagement signal for a ramped out disengagement of clutch 20 upon receipt of the disengage signal from transmission shift controller 33. No adverse oscillatory responses are anticipated for this predetermined open loop disengagement of clutch 20.

Figure 3:
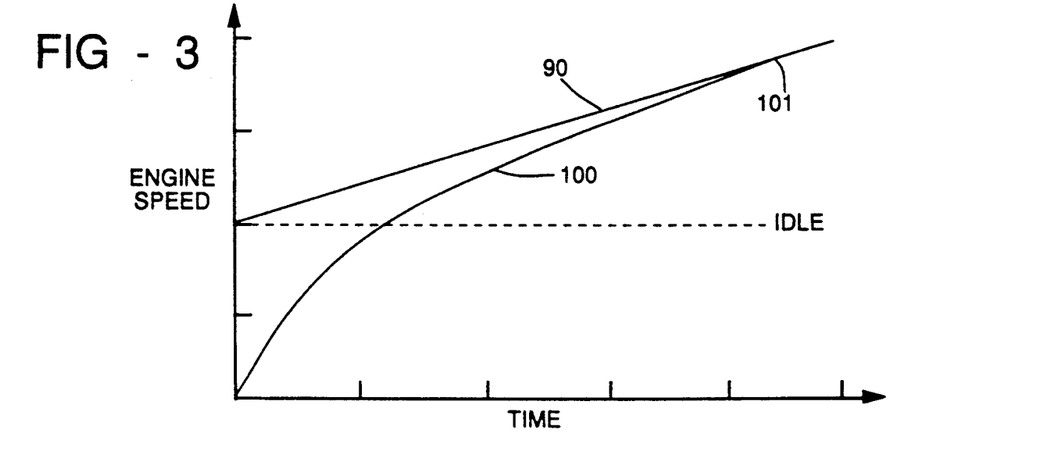
FIG. 3 illustrates the ideal response of engine speed and transmission input speed over time for launch of the motor vehicle.
Figure 4:
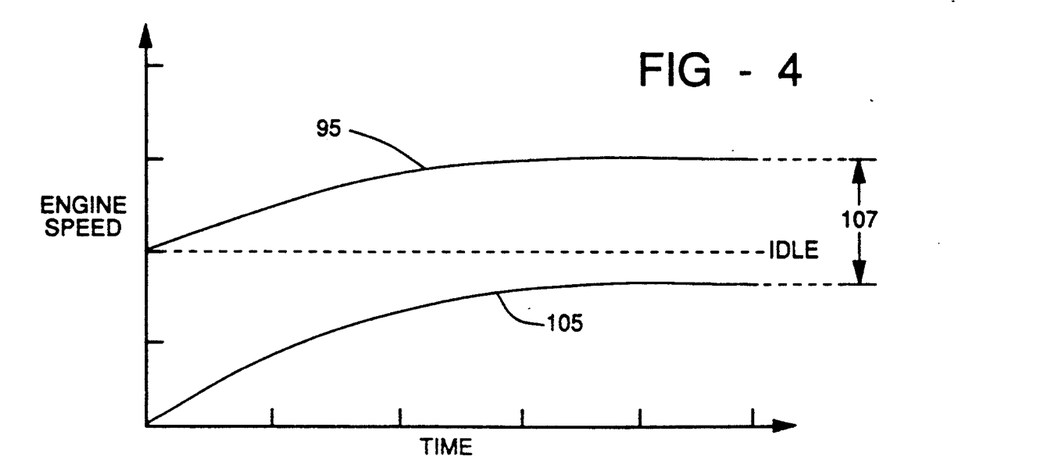
FIG. 4 illustrates the ideal response of engine speed and transmission input speed over time for creeping of the motor vehicle.

FIGS. 3 and 4 illustrate the two cases of starting the vehicle from a full stop. FIGS. 3 and 4 illustrate the engine speed and the transmission input speed during ideal clutch engagement. FIG. 3 illustrates the case of launch. FIG. 4 illustrates the case of creep.

FIG. 3 illustrates the case of launch, that is starting out from a stop in order to proceed at a reasonable speed. Initially, the engine speed 90 is at idle. Thereafter engine speed 90 monotonically increases within the time frame of FIG. 3. Engine speed 90 either increases or remains the same. Ideally engine speed 90 increases until the torque produced by engine 10 matches the torque required to accelerate the vehicle. At high load this engine speed may be in the mid range between the idle speed and the maximum engine speed. This constant engine speed corresponds to the engine torque required to match clutch torque and driveline torque and achieve a balance between engine output torque and the vehicle load torque. This torque level is the ideal clutch torque because a higher clutch torque would stall engine 10 and a lower clutch torque would allow the engine speed to increase too much. Ultimately the vehicle would accelerate to a speed where clutch 20 can be fully engaged. Thereafter the balance between engine torque and load torque is under the control of the driver via the throttle setting and clutch actuation controller 60 would continue to command full clutch engagement.

When the vehicle is stopped and clutch 20 fully disengaged, transmission input speed 100 is initially zero. This is the case for starting the vehicle. However, as further explained below, this same technique can be used for smooth clutch engagement upon shifting gears while moving. Thus the transmission input speed may initially be a value corresponding to the vehicle speed. Upon partial engagement of clutch 20, transmission input speed 100 increases and approaches engine speed 90 asymptotically. At a point 101, transmission input speed 100 is sufficiently close to engine speed 90 to achieve full engagement of clutch 20 without exciting the torsional compliance of the driveline of the vehicle. At this point clutch 20 is fully engaged. Thereafter transmission input speed 100 tracks engine speed 90 until clutch 20 is disengaged when the next higher final gear ratio is selected by transmission controller 33. The system preferably also operates for the case in which the vehicle is not stopped and the initial transmission input speed is nonzero.

FIG. 4 illustrates the engine speed and transmission input speed for the case of creep. In the creep mode, clutch 20 must be deliberately slipped in order to match the available engine torque at an engine speed above idle and the required torque. FIG. 4 illustrates engine speed 95 rising from idle to a plateau level. In a similar fashion input speed 105 rises from zero to a predetermined level. This predetermined level is less than the engine idle speed in this example. The creep mode is required when the desired vehicle speed implies a transmission input speed less than idle for the lowest gear ratio. The creep mode may also be required when the desired vehicle speed implies a transmission input speed above engine idle and engine 10 cannot produce the required torque at this engine speed. Note that there is a speed difference 107 between the engine speed 95 and the input speed 105 under quiescent conditions. This difference 107 represents the slip speed required for this creep operation.

Figure 5:
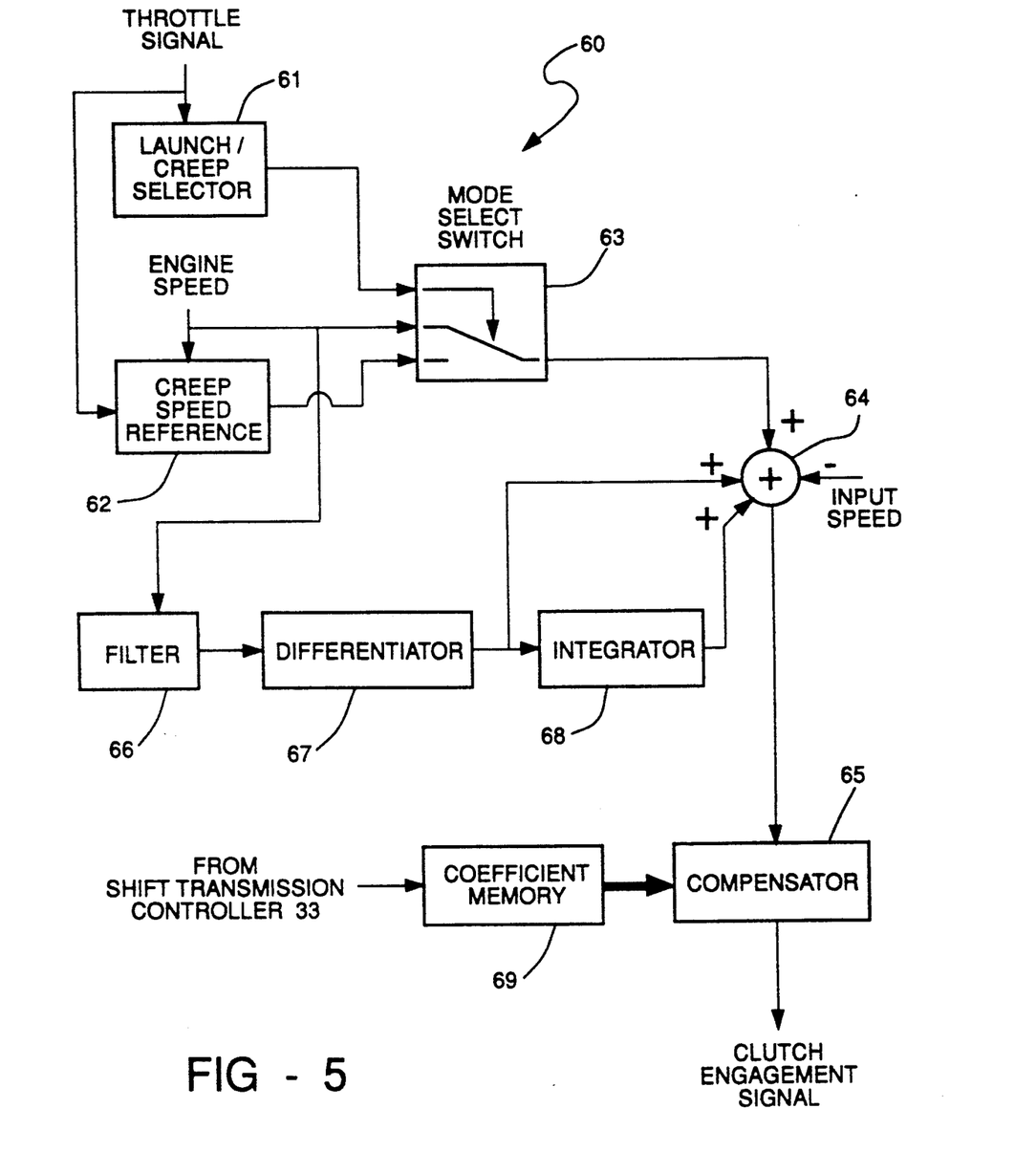
FIG. 5 illustrates a preferred embodiment of the clutch actuation controller of the present invention.

FIG. 5 illustrates schematically the control function of clutch actuation controller 60. As also illustrated in FIG. 1, clutch actuation controller 60 receives the throttle signal from throttle 11, the engine speed signal from engine speed sensor 13 and the transmission input speed signal from transmission input speed sensor 31. Clutch actuation controller 60 illustrated in FIG. 5 generates a clutch engagement signal that is supplied to clutch actuator 27 for operation of the friction clutch 20. Although not shown in FIG. 5, the degree of clutch actuation, together with the throttle setting, the engine speed and the vehicle characteristics determine the transmission input speed that is sensed by transmission input speed sensor 31 and supplied to clutch actuation controller 60. Therefore, the control schematic illustrated in FIG. 5 is a closed loop system.

The control function illustrated in FIG. 5 is needed only for clutch positions between touch point 81 and full engagement. Clutch engagement less than that corresponding to touch point 81 provide no possibility of torque transfer because clutch 20 is fully disengaged. Clutch actuation controller 60 preferably includes some manner of detection of the clutch position corresponding to touch point 81. Techniques for this determination are known in the art. As an example only, the clutch position at touch point 81 can be determined by placing transmission 30 in neutral and advancing clutch 20 toward engagement until transmission input speed sensor 31 first detects rotation. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function illustrated in FIG. 5.

Clutch actuation controller 60 is preferably realized via a microcontroller circuit. Inputs corresponding to the engine speed, the transmission input speed and the throttle setting must be in digital form. These input signals are preferably sampled at a rate consistent with the rate of operation of the microcontroller and fast enough to provide the desired control. As previously described, the engine speed, transmission input speed and transmission output speed are preferably detected via multitooth wheels whose teeth rotation is detected by magnetic sensors. The pulse trains detected by the magnetic sensors are counted during predetermined intervals. The respective counts are directly proportional to the measured speed. For proper control the sign of the transmission input speed signal must be negative if the vehicle is moving backwards. Some manner of detecting the direction of rotation of input shaft 25 is needed. Such direction sensing is conventional and will not be further described. The throttle setting is preferably detected via an analog sensor such as a potentiometer. This analog throttle signal is digitized via an analog to-digital converter for use by the microcontroller. The microcontroller executes the processes illustrated in FIGS. 5 by discrete difference equations in a manner known in the art. The control processes illustrated in FIG. 5 should therefore be regarded as an indication of how to program the microcontroller embodying the invention rather than discrete hardware. It is feasible for the same microcontroller, if of sufficient capacity and properly programmed, to act as both clutch actuation controller 60 and as transmission shift controller 33. It is believed that an Intel 80C196 microcontroller has sufficient computation capacity to serve in this manner.

The throttle signal received from throttle 11 is supplied to launch/creep selector 61 and to creep speed reference 62. Launch/creep selector 61 determines from the throttle signal whether to operate in the launch mode or to operate in the creep mode. In the preferred embodiment of the present invention, launch/creep selector 61 selects the launch mode if the throttle signal indicates greater than 25% of the full throttle setting. In other cases launch/creep selector 61 selects the creep mode.

Creep speed reference 62 receives the throttle signal and the engine speed signal and generates a creep speed reference signal. This creep speed reference signal is determined as follows:

$$R_{crp} = E_{sp} \frac{T}{T_{ref}} \quad (1)$$

where: $R_{crp}$ is the creep speed reference signal; $E_{sp}$ is the measured engine speed; $T$ is the throttle signal; and $T_{ref}$ is a throttle reference constant equal to the throttle signal for 25% full throttle. The creep speed reference signal is the product of the engine speed signal and the ratio of the actual throttle to 25% full throttle. No creep speed reference signal is required for throttle settings above 25% of full throttle because the launch mode is applicable rather than the creep mode. Note that this creep speed reference signal makes the speed reference signal continuous even when switching between the launch mode and the creep mode. Thus no instabilities are induced if changes in the throttle setting causes switching between the two modes.

Mode select switch 63 determines the mode of operation of clutch actuation controller 60. Mode select switch 63 receives the mode selection determination made by launch/creep selector 61. Mode select switch 63 selects either the engine speed signal or the creep speed reference signal depending upon the mode determined by launch/creep selector 61. In the event that the launch mode is selected mode select switch 63 selects the engine speed for control. Thus in the launch mode the clutch engagement is controlled so that the transmission input speed matches the engine speed. In the event that the creep mode is selected mode select switch 63 selects the creep speed reference signal for control. In creep mode the clutch engagement is controlled to match transmission input speed to the creep speed reference signal. This is equivalent to controlling clutch engagement to match the actual clutch slip to desired slip speed. In either mode, the speed reference signal is a transmission input speed reference.

Algebraic summer 64 supplies the input to compensator 65. This input is the difference between the speed reference signal selected by mode select switch 61 and the input speed signal from transmission input speed sensor 31, with the addition of some other terms to be discussed below. Compensator 65 includes a transfer function that is an approximate inverse model of the torsional oscillatory response of the vehicle driveline to torque inputs.

The transfer function of compensator 65 is selected to control clutch engagement via clutch actuator 27 to damp oscillations in the driveline. In the typical heavy truck to which this invention is applicable, the torsional compliance of the driveline causes the driveline transfer function to have a pair of lightly damped poles that may range from 2 to 5 Hz. The exact value depends upon the vehicle characteristics. The transfer function of compensator 65 provides a notch filter in the region of these poles. The frequency band of the notch is sufficiently broad to cover the range of expected vehicle frequency responses. This notch filter preferably includes two complex zeros whose frequency is in the frequency range of the expected poles in the vehicle transfer function. Thus the total response of the closed loop system has highly damped eigen values providing a less oscillatory system.

Compensator 65 also includes an integral function. A pole/zero pair near zero preferably provides this integral function. This type transfer function is known as lag compensation. Provision of this integral function within compensator 65 serves to ensure clutch lockup when operating in the launch mode. The integration rate of compensator 65 can be adjusted by corresponding integration coefficients. The existence of any long term difference between the speed reference signal selected by mode select switch 63 and the transmission input speed cause the integral function of compensator 65 to generate an increasing signal. Any such increasing signal serves to drive the clutch engagement signal toward full clutch engagement. This ensures that clutch 20 is fully engaged at point 101 at some predetermined maximum time following start up of the vehicle when in the launch mode. In the creep mode, this integral function of compensator 65 ensures that there is no long term error between the creep speed reference signal and the transmission input speed.

The transfer function of the compensator 65 preferably follows the form:

$$C(s) = k \frac{(s + a)(s^2 + bs + c^2)}{s(s + d)(s + e)} \quad (2)$$

where: k is the compensator gain constant; a, b, c, d and e are constants. The term $$\frac{(s + a)}{s}$$

implements the lag function. The constant a is positive and near zero. The term $$\frac{(s^2 + bs + c^2)}{(s + d)(s + e)}$$

implements the notch filter. The roots of $(s^2+bs+c^2)$ provide the complex zeros of the desired notch filter. The constants d and e are positive numbers that are sufficiently large to not interfere with the closed loop stability. Equation (2) is in the form of a continuous time transfer function. In the preferred embodiment a microcontroller implements compensator 65 in discrete difference equations. Those skilled in the are would understand how to convert this continuous time transfer function into appropriate discrete difference equations.

A feedforward signal is provided in the clutch engagement signal via an engine speed differential signal. The engine speed signal is suitably filtered via low pass filter 66 to reduce noise in the differential signal. Differentiator 67 forms a differential signal proportional to the rate of change in the engine speed. This engine speed differential signal and its integral formed by integrator 68 are supplied to algebraic summer 64. Algebraic summer 64 sums the engine speed differential signal from differentiator 67 and the integral signal from integrator 68 with the other signals previously described to form the input to compensator 64.

The feedforward signal permits better response of clutch actuation controller 60 when the engine speed is accelerating. Under conditions of engine speed acceleration the feedforward signal causes rapid engagement of clutch 20 proportional to the rate of engine acceleration. The engine speed can increase rapidly under full throttle conditions before the driveline torque is established. This is because the speed of response of clutch actuation controller 60 without this feedforward response is low compared with the peak engine speed of response. With this feedforward response rapid engine acceleration results in more rapid than otherwise clutch engagement. The additional clutch engagement tends to restrain increase in engine speed by requiring additional torque from the engine. When the engine speed reaches a constant value, the differential term decays to zero and integrator 68 retains the clutch engagement needed to restrain engine speed. Other portions of the control function then serve to provide asymptotic convergence of the transmission input speed to the reference speed.

As noted above, the elements of FIG. 5 are preferably implemented via discrete difference equations in a microcontroller. The present invention can be advantageously employed for clutch re-engagement following shifts of the transmission. In this event the same control processes illustrated in FIG. 5 would be employed, including the discrete difference equations for compensator 65. The control processes for transmission shifts would differ from the preceding description in selection of coefficients in the discrete difference equations embodying clutch actuation controller 60. Coefficients for the discrete difference equations for each selected gear ratio are stored in coefficient memory 69 within the microcontroller embodying clutch actuation controller 60. A particular set of these coefficients would be recalled from coefficient memory 69 depending upon the currently engaged gear ratio. These coefficients are employed in the discrete difference equations forming compensator 65. In other respects the invention would operate the same as described above.

The result of this construction is control of clutch actuation to minimize oscillations in the vehicle driveline. The higher frequency components of clutch actuation controller 60 controls clutch 20 via clutch actuator 27 to damp oscillations in the vehicle driveline. The integral component of clutch actuation controller 60 minimizes long term error and ensures full clutch engagement when operating in the launch mode.

I claim:

1. In a combination including a source of rotary motive power, a transmission, a friction clutch for selectively coupling the source of rotary motive power with the transmission and having an input shaft connected to the source of motive power and an output shaft connected to the transmission, and at least one inertially-loaded traction wheel connected via the transmission to the output shaft of the friction clutch having a torsional compliance exhibiting an oscillatory response to torque inputs, an automatic controller for the friction clutch comprising:

an engine speed sensor connected to the source of motive power for generating an engine speed signal corresponding to rotational speed of the source of motive power;

a reference speed generator connected to said engine speed sensor for generating a reference speed signal;

a transmission input speed sensor connected to the output shaft of the friction clutch for generating a transmission input speed signal corresponding to rotational speed of the output shaft of the friction clutch;

a clutch actuator connected to the friction clutch for controlling engagement of the friction clutch from disengaged to fully engaged according to a clutch engagement signal; and a controller connected to said reference speed generator, said transmission input speed sensor, and said clutch actuator including an algebraic summer connected to said reference speed generator and said transmission input speed sensor forming an algebraic sum signal corresponding to the difference between (1) said reference speed signal and (2) said transmission input speed signal, and a compensator connected to said algebraic summer for generating a clutch engagement signal from said algebraic sum signal for supply to said clutch actuator for engaging the friction clutch in a manner causing said transmission input speed signal to asymptotically approach said reference speed signal.

2. The automatic clutch controller as claimed in claim 1, wherein:

said compensator has a transfer function having a notch filter with a frequency band in the range of the expected frequency of the oscillatory response to torque inputs of the at least one inertially-loaded traction wheel, said compensator thereby reducing the oscillatory response to torque inputs of the at least one inertially-loaded traction wheel.

3. The automatic clutch controller as claimed in claim 1, wherein:
said reference speed generator is connected to said engine speed sensor and generates said reference speed signal proportional to said engine speed signal; and
said controller wherein
said compensator includes an integral function for generating said clutch engagement signal for fully engaging the friction clutch within a predetermined interval of time after initial partial engagement.

4. The automatic clutch controller as claimed in claim 1, wherein:
said controller further includes
a differentiator connected to said engine speed sensor for generating a differential signal corresponding to the rate of change of said engine speed signal, and
said algebraic summer is further connected to said differentiator for generating said algebraic sum signal corresponding to the sum of (1) the difference between said reference speed signal and said transmission input speed signal, (2) said differential signal.

5. The automatic clutch controller as claimed in claim 4, wherein:
said controller further includes
a low pass filter disposed between said engine speed sensor and said differentiator.

6. The automatic clutch controller as claimed in claim 4, wherein
said controller further includes
an integrator connected to said differentiator for forming an integral signal corresponding to the time integral of said differential signal, and
said algebraic summer is further connected to said integrator and generates said algebraic sum signal corresponding to the sum of (1) the difference between said reference speed signal and said transmission input speed signal, (2) said differential signal and (3) said integral signal.

7. The automatic clutch controller as claimed in claim 1, wherein the combination further includes a throttle for control of torque generated by the source of motive power, said automatic clutch controller further comprising:
a throttle sensor connected to the throttle for generating a throttle signal indicative of throttle position; and
said reference speed generator being connected to said engine speed sensor and said throttle sensor for generating said reference speed signal corresponding to said engine speed signal and said throttle signal.

8. The automatic clutch controller as claimed in claim 7, wherein:
said reference speed generator generates said reference speed signal as follows $$S_{ref} = E_{sp} \frac{T}{T_{ref}}$$

where: $S_{ref}$ is the reference speed signal; $E_{sp}$ is said engine speed signal; T is said throttle signal; and $T_{ref}$ is a throttle reference constant equal to the throttle signal for a predetermined throttle position.

9. The automatic clutch controller as claimed in claim 1, the combination further including a throttle for control of torque generated by the source of motive power, said automatic clutch controller further comprising:
a throttle sensor connected to the throttle for generating a throttle signal indicative of throttle position; and
said reference speed generator being further connected to said throttle and including
a launch/creep selector connected to said throttle sensor for selecting either a launch mode or a creep mode based upon the magnitude of said throttle signal,
a creep speed reference generator connected to said engine speed sensor and said throttle sensor for generating a creep speed reference signal corresponding to said engine speed signal and said throttle signal, and
a mode selection switch connected to said engine speed sensor, said launch/creep selector and said creep speed reference circuit for selectively generating a reference speed signal corresponding to (1) said engine speed signal if said launch mode is selected and (2) said creep speed reference signal if said creep mode is selected.

10. The automatic clutch controller as claimed in claim 9, wherein:
said launch/creep selector selects said launch mode if said throttle signal indicates a throttle position of greater than a predetermined throttle position and otherwise selects said creep mode.

11. The automatic clutch controller as claimed in claim 10, wherein:
said reference speed generator wherein
said launch/creep selector is 25% of full throttle.

12. The automatic clutch controller as claimed in claim 9, wherein:
said creep speed reference generator generates said creep speed reference signal as follows $$S_{crp} = E_{sp} \frac{T}{T_{ref}}$$

where: $S_{crp}$ is the creep reference speed signal; $E_{sp}$ is said engine speed signal; T is said throttle signal; and $T_{ref}$ is a throttle reference constant equal to the throttle signal for said predetermined throttle position 13. The automatic clutch controller as claimed in claim 1, wherein:
said compensator generates said clutch engagement signal indicative of desired clutch position; and
said clutch actuator controls the position of the friction clutch corresponding to the desired clutch position indicated by said clutch engagement signal.

14. The automatic clutch controller as claimed in claim 1, wherein:
said compensator generates said clutch engagement signal indicative of desired clutch pressure; and
said clutch actuator controls the pressure of the friction clutch corresponding to the desired clutch pressure indicated by said clutch engagement signal.

15. In a combination including a source of rotary motive power, a throttle for control of torque generated by the source of motive power, a transmission, a friction clutch for selectively coupling the source of rotary motive power with the transmission and having an input shaft connected to the source of motive power and an output shaft connected to the transmission, and at least one inertially-loaded traction wheel connected via the transmission to the output shaft of the friction clutch having a torsional compliance exhibiting an oscillatory response to torque inputs, an automatic controller for the friction clutch comprising:

a throttle sensor connected to the throttle for generating a throttle signal indicative of throttle position;

an engine speed sensor connected to the source of motive power for generating an engine speed signal corresponding to rotational speed of the source of motive power;

a reference speed generator connected to said throttle sensor and said engine speed sensor, said reference speed generator including a launch/creep selector connected to said throttle sensor for selecting either a launch mode or a creep mode based upon the magnitude of said throttle signal, a creep speed reference generator connected to said engine speed sensor and said throttle sensor for generating a creep speed reference signal corresponding to said engine speed signal and said throttle signal, and a mode selection switch connected to said engine speed sensor, said launch/creep selector and said creep speed reference generator for selectively generating a reference speed signal corresponding said engine speed signal if said launch mode is selected and corresponding to said creep speed reference signal if said creep mode is selected;

a transmission input speed sensor connected to an output shaft of the friction clutch for generating a transmission input speed signal corresponding to rotational speed of the output shaft of the friction clutch;

a clutch actuator connected to the friction clutch for controlling engagement of the friction clutch from disengaged to fully engaged according to a clutch engagement signal; and a controller connected to said engine speed sensor, said transmission input speed sensor and said clutch actuator including an algebraic summer connected to said reference speed generator and said transmission input speed sensor forming an algebraic sum signal corresponding to the difference between (1) said reference speed signal and (2) said transmission input speed signal, and a compensator connected to said algebraic summer for generating a clutch engagement signal from said algebraic sum signal for supply to said clutch actuator for engaging the friction clutch in a manner causing said transmission input speed signal to asymptotically approach said reference speed signal.

16. The automatic clutch controller as claimed in claim 15, wherein:

said compensator has a transfer function having a notch filter with a frequency band in the range of the expected frequency band of the oscillatory response to torque inputs of the at least one inertially-loaded traction wheel, said compensator thereby reducing the oscillatory response to torque inputs of the at least one inertially-loaded traction wheel.

17. The automatic clutch controller as claimed in claim 15, wherein:

said compensator includes an integral function for generating said clutch engagement signal for fully engaging the friction clutch within a predetermined interval of time after initial partial engagement when said launch mode is selected.

18. The automatic clutch controller as claimed in claim 15, wherein:

said controller further includes a differentiator connected to said engine speed sensor for generating a differential signal corresponding to the rate of change of said engine speed signal, and said algebraic summer is further connected to said differentiator for generating said algebraic sum signal corresponding to the sum of (1) the difference between said reference speed signal and said transmission input speed signal, and (2) said differential signal.

19. The automatic clutch controller as claimed in claim 18, wherein:

said controller further includes a low pass filter disposed between said engine speed sensor and said differentiator.

20. The automatic clutch controller as claimed in claim 18, wherein:

said controller further includes an integrator connected to said differentiator for forming an integral signal corresponding to the time integral of said differential signal, and said algebraic summer is further connected to said integrator and generates said algebraic sum signal corresponding to the sum of (1) the difference between said reference speed signal and said transmission input speed signal, (2) said differential signal and (3) said integral signal.

21. The automatic clutch controller as claimed in claim 15, wherein:

said launch/creep selector selects said launch mode if said throttle signal indicates a throttle position of greater than a predetermined throttle position and otherwise selects said creep mode.

22. The automatic clutch controller as claimed in claim 21, wherein:

said predetermined throttle position of said launch/creep selector is 25% of full throttle.

23. The automatic clutch controller as claimed in claim 15, wherein:

said creep speed reference generator generates said creep speed reference signal as follows $$R_{crp} = E_{sp} \frac{T}{T_{ref}}$$

where: $R_{crp}$ is the reference speed signal; $E_{sp}$ is said engine speed signal; $T$ is said throttle signal; and $T_{ref}$ is a throttle reference constant equal to the throttle signal for said predetermined throttle position.

24. The automatic clutch controller as claimed in claim 15, wherein:

said compensator generates said clutch engagement signal indicative of desired clutch position; and said clutch actuator controls the position of the friction clutch corresponding to the desired clutch position indicated by said clutch engagement signal.

25. The automatic clutch controller as claimed in claim 15, wherein:

said compensator generates said clutch engagement signal indicative of desired clutch pressure; and said clutch actuator controls the pressure of the friction clutch corresponding to the desired clutch pressure indicated by said clutch engagement signal.

26. In a combination including a source of rotary motive power, a transmission, a friction clutch for selectively coupling the source of rotary motive power with the transmission and having an input shaft connected to the source of motive power and an output shaft, the transmission having an input shaft connected to the output shaft of the friction clutch and providing a selectable gear ratio to an output shaft, and at least one inertially-loaded traction wheel connected to the output shaft of the transmission having a torsional compliance exhibiting an oscillatory response to torque inputs, an automatic controller for the friction clutch comprising:

a transmission shift controller connected to the transmission for controlling the gear ratio selected by the transmission;

an engine speed sensor connected to the source of motive power for generating an engine speed signal corresponding to rotational speed of the source of motive power;

a reference speed generator connected to said engine speed sensor for generating a reference speed signal;

a transmission input speed sensor connected to the input shaft of the transmission for generating a transmission input speed signal corresponding to rotational speed of the output shaft of the friction clutch;

a clutch actuator connected to the friction clutch for controlling engagement of the friction clutch from disengaged to fully engaged according to a clutch engagement signal; and a controller connected to said transmission shift controller, said reference speed generator, said transmission input speed sensor, and said clutch actuator, said controller implemented via discrete difference equations executed by a microcontroller and including an algebraic summer connected to said reference speed generator and said transmission input speed sensor forming an algebraic sum signal corresponding to the difference between (1) said reference speed signal and (2) said transmission input speed signal, a coefficient memory for storing a plurality of sets of coefficients, one set of coefficients corresponding to each selectable gear ratio of the transmission, and a compensator connected to said algebraic summer and said coefficient memory for generating a clutch engagement signal from said algebraic sum signal for supply to said clutch actuator for engaging the friction clutch in a manner causing said transmission input speed signal to asymptotically approach said reference speed signal, said compensator implemented in discrete difference equations employing a set of coefficients recalled from said coefficient memory corresponding to the gear ratio of the transmission.

27. The automatic clutch controller as claimed in claim 26, wherein:

said compensator has a transfer function having a notch filter with a frequency band in the range of the expected frequency band of the oscillatory response to torque inputs of the at least one inertially-loaded traction wheel, said compensator thereby reducing the oscillatory response to torque inputs of the at least one inertially-loaded traction wheel.

28. The automatic clutch controller as claimed in claim 26, wherein:

said reference speed generator is connected to said engine speed sensor and generates said reference speed signal proportional to said engine speed signal; and said controller wherein said compensator includes an integral function for generating said clutch engagement signal for fully engaging the friction clutch within a predetermined interval of time after initial partial engagement.

* * * * *